United States Patent
Rijavec et al.

(10) Patent No.: US 6,781,711 B1
(45) Date of Patent: Aug. 24, 2004

(54) METHOD AND SYSTEM FOR EFFICIENT TRANSMITTAL AND PRESENTATION OF COMPLEX IMAGES

(75) Inventors: Nenad Rijavec, Longmont, CO (US); Reinhard Hohensee, Boulder, CO (US); Jean Margaret Aschenbrenner, Boulder, CO (US); Arthur Ray Roberts, Boulder, CO (US); David Earl Stone, Longmont, CO (US); John Thomas Varga, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/571,333

(22) Filed: May 15, 2000

(51) Int. Cl.[7] .............................. G06F 15/00; G06K 9/36
(52) U.S. Cl. ........................ 358/1.2; 358/1.1; 358/1.14; 358/1.15; 382/232
(58) Field of Search ............................... 358/1.2, 1.14, 358/1.15, 1.18, 527, 537, 444, 538, 1.1; 707/506, 508, 517; 382/232, 282; 348/14.13, 14.12

(56) References Cited

U.S. PATENT DOCUMENTS

| | | |
|---|---|---|
| 5,710,835 A | 1/1998 | Bradley |
| 5,819,301 A | 10/1998 | Rowe et al. |
| 5,915,046 A | 6/1999 | Echigo et al. |
| 6,330,068 B1 * | 12/2001 | Matsuyama ................ 358/1.14 |

\* cited by examiner

Primary Examiner—Twyler Lamb
(74) Attorney, Agent, or Firm—Dillon & Yudell, L.L.P.; Scott W. Reid

(57) ABSTRACT

A method for transmitting image data to a presentation device, such as a printer. The image data is first divided into layers. Each layer is then further divided into tiles. During the rasterization process, tiles, that are repeated within the image are provided a reference identification (ID). During the transmission of the image to the presentation device, a data transmission utility is utilized to determine the most efficient manner to transmit the image tiles and present the image to the presentation device. Resource tiles only have to be downloaded once and every subsequent time the tile appears within an image, only the subsequent tile position and reference ID of the resource are sent, in lieu of the entire tile data being transmitted to the device. The data transmission utility determines which of a number of transmission processes to utilize to transmit the image data, including the speed of the presentation device, available transmission bandwidth, transmission speed of each tile (or relative size of each tile), and size of the image.

17 Claims, 5 Drawing Sheets

METHOD AND SYSTEM FOR EFFICIENT TRANSMITTAL AND PRESENTATION OF COMPLEX IMAGES

BACKGROUND OF THE INVENTION

1. Technical Field

The present invention relates in general to image processing and, in particular, to efficient transmission of images in an electronic medium. Still more particularly, the present invention relates to a method, system and program product that allows large, high resolution images to be processed and transmitted more efficiently in an electronic medium.

2. Description of the Related Art

Transmission and presentation of complex (i.e., high resolution) images, including multi-page documents, via electronic media is an important function of today's multimedia computing and Internet environments. An image, in the context of this application, is an electronic representation of a picture as an array of raster data. Image data can be generated by a computer program, or generated by electronically scanning such items as illustrations, drawings, photographs, and signatures. Regardless of the source, images may contain large amounts of data. For example, an uncompressed letter-size color image at 24 bits/pixel requires approximately 96 MB of storage. An uncompressed letter-size color image at 32 bits/pixel (such as is needed for the CMYK color space used in printing) requires approximately 128 MB of storage.

As more and more image applications continue to emerge to meet the needs of various industries, expectations with regard to performance are rising and costs are falling, thereby increasing the need for efficiencies in image processing and presentation. Due to significant improvements in processing speeds and ability of computers, which typically complete the rasterization process, processing problems have been reduced. Additionally, less expensive computer storage and memory are making the handling of larger volumes of image data increasingly more feasible. However, with the development of faster presentation devices, such as large scale digital color printers, the field of image processing has encountered problems associated with transmitting the large amounts of data required by color images in an efficient manner.

Often, particularly in the case of color data, the size of the raster image is quite large and problems are encountered when trying to deliver image data quickly to a presentation device. This problem is particularly acute if the presentation device is a high speed color printer, running at over 100 pages a minute. Even if the data format supports sophisticated layering and data compression techniques, bandwidth to the presentation device can be a problem.

High speed presentation of large, high resolution images currently requires both very high bandwidth and central processing unit (CPU) speeds. Additional bandwidth has proven to be currently either unavailable or prohibitively expensive. As a result, it is difficult to satisfy the bandwidth requirements of high speed printers or other image presentation devices.

In multi-page jobs, particularly in some market segments, such as printing marketing material and statements, there are images that repeat on many, if not all, pages. Examples include a corporate logo or perhaps a picture of an insurance agent. If the data is rasterized in the presentation device there are systems, such as IBM's Advanced Function Printing, that allow repeating objects to be defined as resources, downloaded once to the presentation device and reused many times. Utilization of shared objects multiple pages which downloading the shared objects only once is also described with respect to text documents in U.S. Pat. No. 5,819,301.

The present invention therefore recognizes that it would be desirable to have a method, system, and program for providing efficient transmission of rasterized image data to a presentation or output device. A method, system and program that ensures that image data is transmitted in a timely manner that ensures that the presentation device always has the image data required for printing a current sheet of a multi-page presentation would be a welcomed improvement. These and other benefits are provided by the present invention.

SUMMARY OF THE INVENTION

A method, system and program for transmitting image data to a presentation device, such as a printer, is disclosed. The image data are first divided into layers. Each layer is then further divided into tiles. During the rasterization process, tiles, that are repeated within the image are defined as resources and accordingly marked for re-use. Alternatively, during implementation of the invention, each tile can be treated as a resource and downloaded once together with a unique identifier.

During the transmission of the image to the presentation device, a particular image data transmission utility is utilized to determine the most efficient manner to transmit the image tiles and present the image. With the tiles marked as resources, once the first tile has been transmitted to the presentation device, every subsequent time the tile appears within an image, the tile position and reference ID (mark) are sent, in lieu of the whole tile being sent to the device. Optionally, a transparency mask is also sent. Position and ID define which resource tile is needed and where to position it in the image, while the transparency mask is combined with any transparency mask in the stored tile and defines how the tile is merged into the image.

The preferred embodiment applies when transmitting a multi-page image having at least one repeated tile (resource). One of three processes are utilized within the image data transmission utility to determine how to efficiently provide the data to the presentation device without causing a break in the presentation output stream. In the preferred embodiments, the algorithm considers the speed of the presentation device, available transmission bandwidth, transmission speed of each tile (or relative size of each tile), and other relevant factors in determining how best to transmit the image to the presentation device.

BRIEF DESCRIPTION OF THE DRAWINGS

Additional objects, features and advantages of the present invention will be more readily apparent from the following detailed description and appended claims when taken in conjunction with the drawings, wherein:

DETAILED DESCRIPTION OF THE PREFERRED EMBODIMENT

Figure 1:
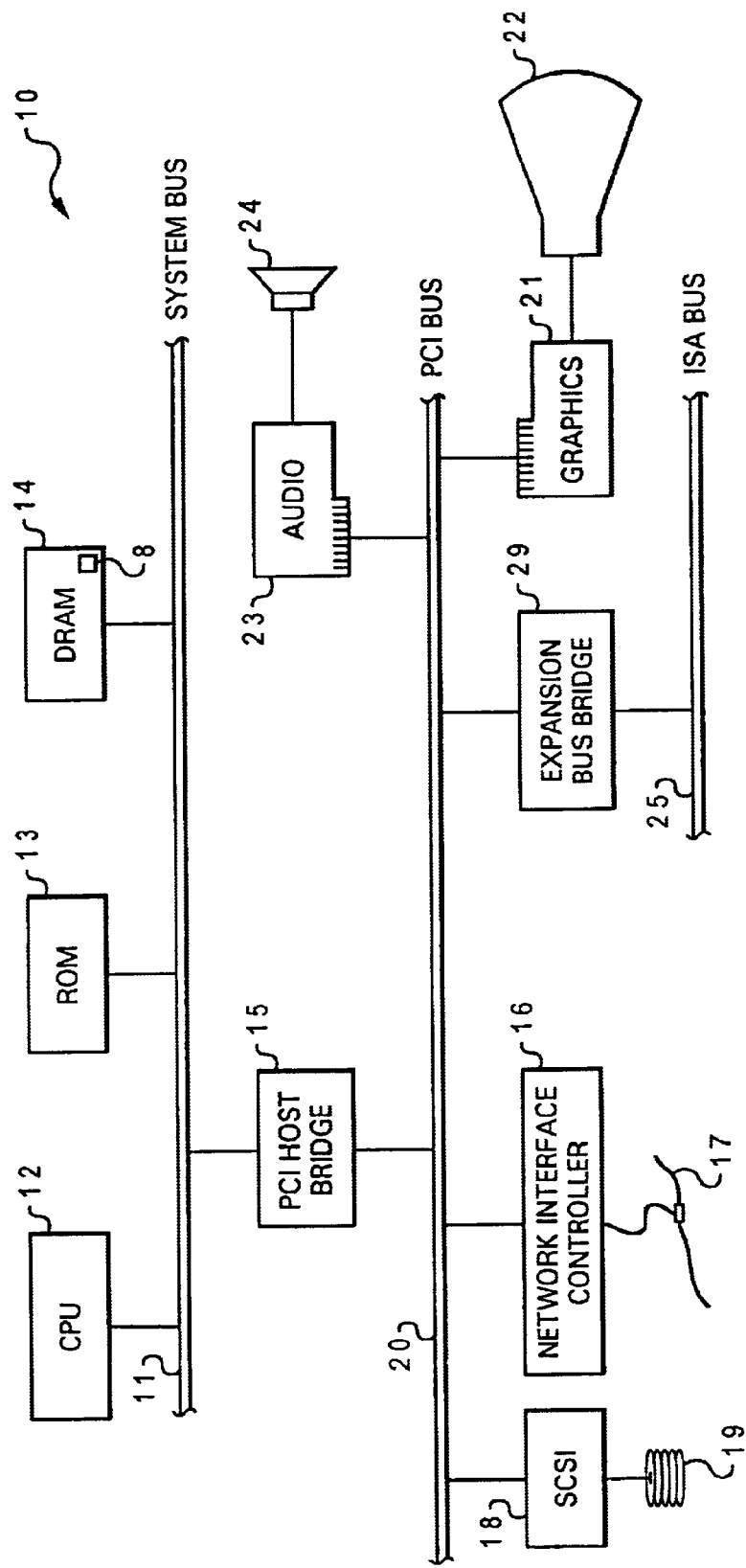
FIG. 1 depicts an illustrative embodiment of a data processing system with which the method and system of the present invention may advantageously be utilized.

With reference now to the figures and in particular with reference to FIG. 1, there is illustrated an exemplary embodiment of a computer system, in which the present invention may be implemented. It should be understood that the invention may, however, be implemented in other types of data processing systems. As shown, computer system 10 has a processor (CPU) 12, a read-only memory (ROM) 13, and a Random-Access Memory (RAM) 14 connected to a system bus 11. CPU 12, ROM 13, and RAM 14 are also coupled to peripheral component interconnect (PCI) local bus 20 of computer system 10 through PCI host bridge 16. PCI host bridge 16 provides a low latency path through which processor 12 may directly access PCI devices mapped anywhere within bus memory or I/O address spaces. PCI host bridge 16 also provides a high bandwidth path for allowing PCI devices to directly access RAM 14.

Also attached to PCI local bus 20 are network interface controller 15, small computer system interface (SCSI) 18, graphics controller 21, audio controller 23, and expansion bus bridge 29. Network interface controller 15 connects computer system 10 to a network 17 through which computer system 10 may and transmit print jobs to a printer or other presentation device. SCSI 18 is utilized to control high-speed SCSI disk drive 19 which may be utilized to store large image files. Graphics controller 21 and audio controller 23 interface a display 22 and speaker 24, respectively. Expansion bus bridge 29, which may be, for example a PCI-to-ISA bus bridge, coupling ISA bus 25 to PCI local bus 20. ISA bus 25 provides slots for connecting additional peripheral components through appropriate adapters.

Computer system 10 also preferably includes a graphical user interface (GUI) and an operating system (OS) that reside within machine readable media to direct the operation of computer system 10. Any suitable machine-readable media may retain the GUI and OS, such as RAM 14, ROM 13, SCSI disk drive 19, or other disk or tape drive (e.g., magnetic diskette, magnetic tape, CD-ROM, optical disk, or other suitable storage media). Any suitable OS, such as the AIX operating system developed by International Business Machines Corporations, may be utilized.

Further, computer system 10 preferably includes at least one software application (e.g., program product including image processing and transmission utilities) 8 that resides within RAM 14. The software application contains instructions that when executed by CPU 12 interact with the OS to execute the operations depicted in the figures and described herein.

The present invention is directed to a method, system, and program that process image data into layers and subsequently into tiles and transmit the tile to a presentation device for presentation. Specifically, the invention determines an efficient manner of transmission for a particular image, given the transmission bandwidth, speed of the device and other factors. The invention substantially improves image data transmission rates and is therefore particularly applicable to high speed printing systems.

For the purposes of illustration, a high speed printer will be utilized as a representative presentation device. It is understood that other types of presentation devices may be utilized within the scope of the invention.

Figure 2A:
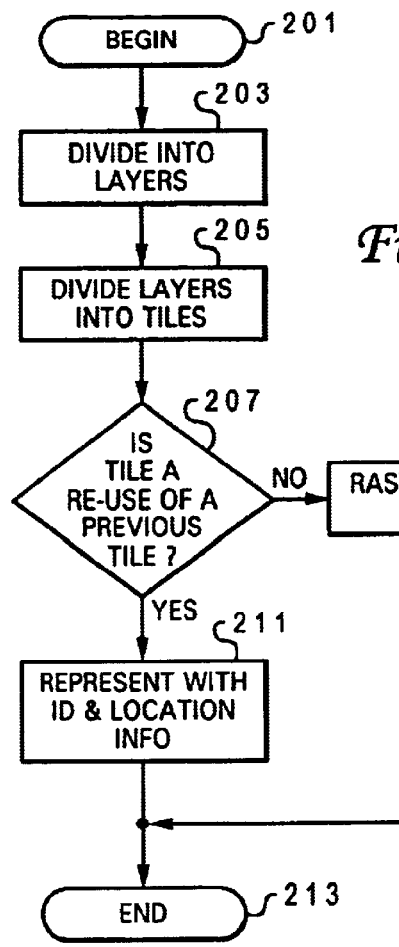
FIGS. 2A and 2B are flow charts of the processing steps for dividing an image into tiles and creating resource tiles according to preferred embodiments of the present invention.

Turning now to FIG. 2A, the processing of image data to create tiles is illustrated. The process begins at block 201, and thereafter proceeds to block 203, where the image is divided into layers. In the illustrated embodiment, a contone layer and line work layer are utilized, as specified by the CPSI+IPMV PostScript page description language developed by Adobe Systems, Inc. Other layering schemes may be utilized by the invention. During implementation, layers can be used to identify common image areas, even if the presented image looks quite different. For example, fixed background text would be carried in a separate layer and captured as a resource by the invention. Once the layers are defined, the layers are each divided into a number of tiles at block 205. The process of dividing layers into tiles and the associated functionality of tiles is described in detail in U.S. patent application, Ser. No. 09/305,258, IBM Doc. No. BLD9-99-001, filed on May 4, 1999, the entire content of which is hereby incorporated by reference. Thus, the image data is encapsulated within tiles.

Returning now to FIG. 2A, once the tiles are generated, a determination is made whether a tile is a re-use of a previous tile in the image at block 207. If s the tile is not re-used, i.e., not previously encountered in the image, perhaps on an earlier page, then the data is rasterized at block 209. In one preferred embodiment, the output image is divided into layers and tiles as the data (usually a page) is being rasterized. Each tile can be treated as a resource. If the tile occurs only once, the raster data for the tile can be sent to the presentation device at a location in the presentation data stream corresponding to its physical location on the page and therefore its presentation order. If, however, the tile occurs more than once (i.e., it is re-used) then the initial tile is defined (tagged) as a resource, and the subsequent tile is represented with an identification (ID) and location information at block 211. The process then ends at block 213.

Whenever a tile is defined as a resource, the tile is downloaded once during transmission of the image to an presentation device (as described later), together with a unique identifier. Accordingly, each time the tile is to be used within an image, instead of the rasterized data for the entire tile being sent to the device again, just the tile position, reference ID, and optionally a transparency mask are specified and transmitted. The ID and position define which resource tile is needed and where to position it in the image. The transparency mask is combined with any transparency mask in the stored tile and defines how the tile is merged into the image.

Figure 2B:
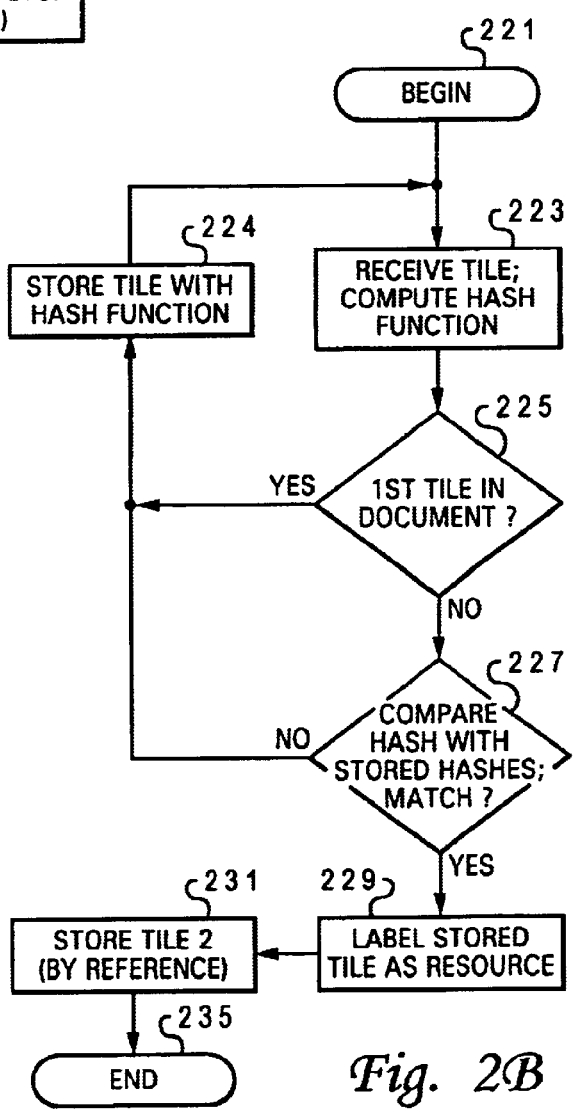

FIG. 2B illustrates the processes of identifying and caching the tile resources. The process begins at block 221 and thereafter proceeds to block 223, when a first occurrence of a tile is encountered. As discussed above, as each image is being rasterized, each layer is divided into tiles. A hash function is computed for rasterized tile data received by a tile comparison utility at block 223. The tile comparison utility may utilize one of several available checksum algorithms, such as message digest 5 (MD5), to calculate the hash function. Depending on the application, the hash function can be computed on either uncompressed or compressed data. For computational efficiency, the hash function is computed only if the tile is a candidate for reuse. Thus, in one embodiment, the tile comparison utility makes a determination of the re-usability of each tile made by computing a simple initial hash value, perhaps based on a data sample instead of a full hash value.

Returning now to FIG. 2B, a determination is made at block 225 of whether the tile for which the present hash value is computed is the very first tile in the document. If the tile is the first tile in the document, there is no previously stored rasterized tile data, and the rasterized tile data for the present tile is stored along with its hash function at block 224. If the rasterized tile data is not the first received, then its hash function is compared to the hash functions of all previously stored rasterized tile data for a possible match at block 227. Matching hash functions indicates that the current tile is a re-use of the stored tile and its rasterized data can be supplied by the invocation of the first tile, as described above. The stored tile is then marked (or tagged) as a resource at block 229. The current tile data is represented and stored only by a reference ID linking it to the stored tile, and location information at block 231. The process then ends at block 235. When the hash functions do not match, the current rasterized tile data is stored along with its hash function at block 224.

In the embodiment that first calculates sample hash functions, the comparison block 227 is followed by a function block in which the full hash functions of both the stored and current rasterized tile data are calculated. The function block is then followed by a second comparison block, which compares the full hash functions to each other. Once the full hash values have been calculated, the sample values are replaced by the full values, which are stored. Thus, the full values will not have to be calculated again.

During transmission of a processed image file to a presentation device, tile resources can be downloaded in several different ways. The determination of the method of transfer is completed within an image data transmission utility. In preferred embodiments, the primary objective of the image data transmission utility is to supply the presentation device with enough data to sustain its rated speed, while minimizing overall transmission time (or use of resources). Several factors are utilized by the image data transmission utility in making this determination. These factors include the size of the image, tile sizes, available bandwidth for transmitting the image data to the presentation device, and output speed of the presentation device. The last two factors are particularly important when outputting to high speed color laser printers, which "print" blank pages if there is not enough data to sustain output. Two time periods are relevant when attempting to efficiently output image data, the download time and the transmission time. Download time refers to the time before actual output begins when the image data, or parts thereof, are buffered at the presentation device. Transmission time refers to the time the data takes to travel from the computer system memory to the presentation device buffer. Transmission may occur both before and during the actual output of the image data. Of course, image data for a particular page must be present (downloaded) prior to the page being printed. However, the invention provides some flexibility in determining when to download tiles and which tiles to download at particular times.

Figure 2C:
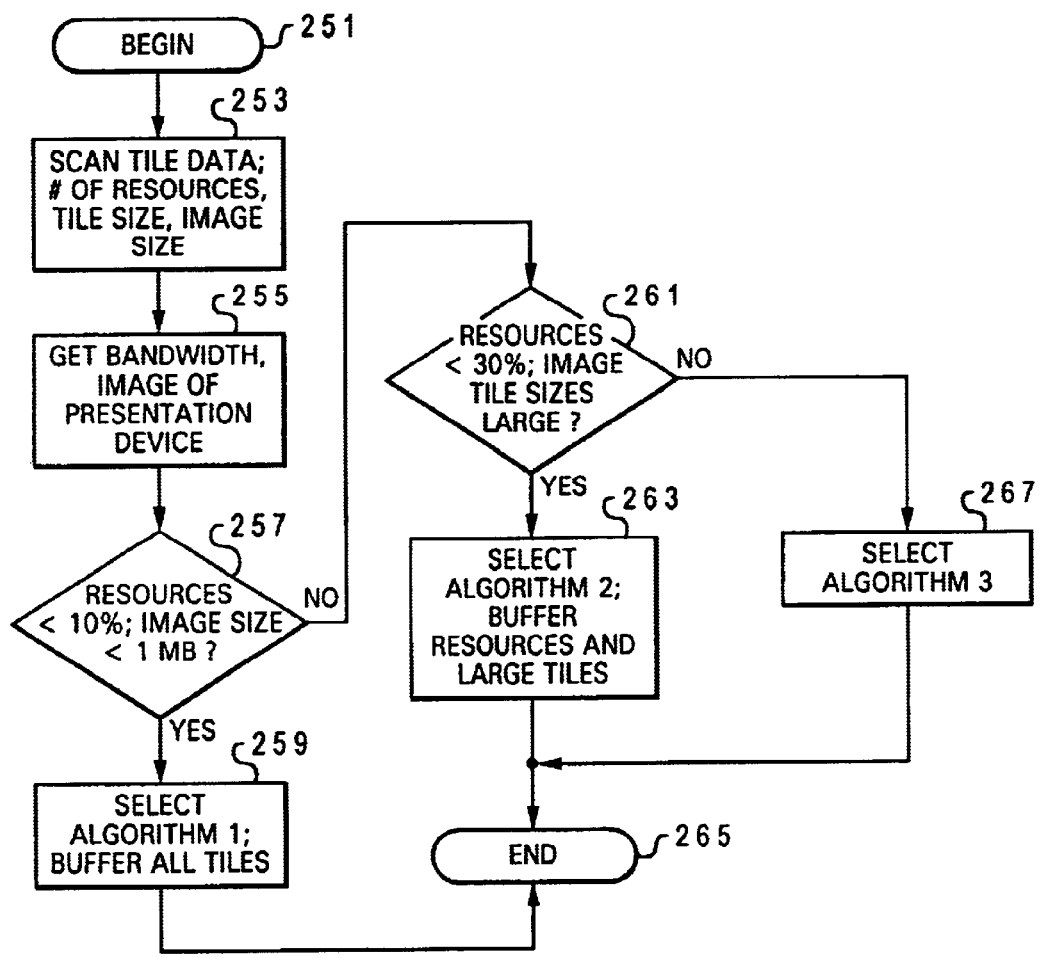
FIG. 2C is a flow diagram illustrating the process of selecting a method of transmission according to a preferred embodiment of the invention.

Referring now to FIG. 2C, there is provided a flow chart of an embodiment of a process for selecting an image data transmission process. The process begins at block 251, and thereafter proceeds to block 253, where the rasterized tile data is analyzed for image size, tile sizes, and number of resources. The bandwidth for transmission to the presentation device and relative speed and output buffer size of the presentation device are also procured at block 255. Both of the above process steps may be initiated upon completion of the rasterization of the image or in response to an output request, such as a print request. Once a print request has been received, the image data transmission utility makes a first determination of whether the number of resources is less than 10% of the total image and the image size is less than a megabyte. If both conditions are met, a first transmission process is selected by which all the tiles are buffered at block 259. Buffering of tiles refers to the process of downloading the tile into an output buffer of the presentation device. When the conditions of block 257 are not met, the image data transmission utility makes a further determination of whether the number of resources are less than 30% of the image and the relative sizes of the tiles at block 261. When the resources are less then 30% and the tile sizes are large (i.e., too large to allow all the tiles for a single page to be transmitted within a "print time window", given the available bandwidth), then a second transmission algorithm is selected, which buffers the resources and all large tiles at block 263. When either of the conditions in block 261 are not met, a third transmission algorithm is selected at block 267. The process then ends at block 265.

It should be noted that the conditions presented above, which references specific percentages, etc., were presented solely for illustrative purposes and are not meant to be limiting on the invention. Selection of a particular transmission process may depend on the type of image being transmitted, so that only more complex images having many resources would utilize the latter two transmission process. Thus, in one embodiment, a particular transmission process may be a default for a particular type of image. For example, images that include predominantly text data are transmitted via the first transmission process, while images such as photographs are transmitted utilizing the third transmission process. The preferred embodiment permits a dynamic selection of the transmission process in a flexible manner (i.e., based on factors which are not pre-set). As described above, the image data transmission utility selects and implements one of a number of available transmission processes, depending upon which transmission process provides a best (or most efficient) transmission of an image. Three such transmission processes are described below.

Figure 3A:
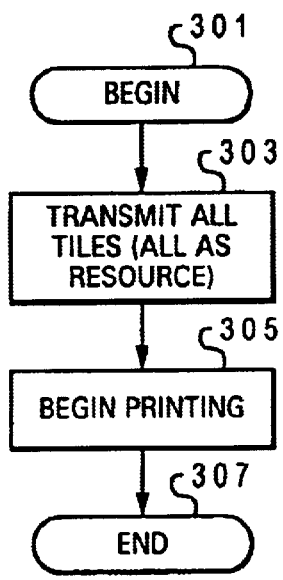
FIGS. 3A, 3B, and 3C are flow charts of processing steps for transmitting the image data according to the present invention.

The first process utilizes the standard "load all, then output" methodology. In this algorithm, as illustrated in FIG. 3A, after the process begins at block 301, all the tiles of an image are considered resources, downloaded, and buffered at block 303 before is the print job commences at block 305. The process of the algorithm then ends at block 307. The printer has all the tiles already buffered when printing begins and is thus far more likely to run at rated speed. A variant of this approach is to declare as resources all tiles of a particular type, e.g., continuous tone (contone) tiles. In this process, a tile becomes a resource no matter how many times it is used. The advantage of this approach is that the rated speed of the device can be more easily sustained. The disadvantage is possibly long download time before a job starts printing.

Figure 3B:
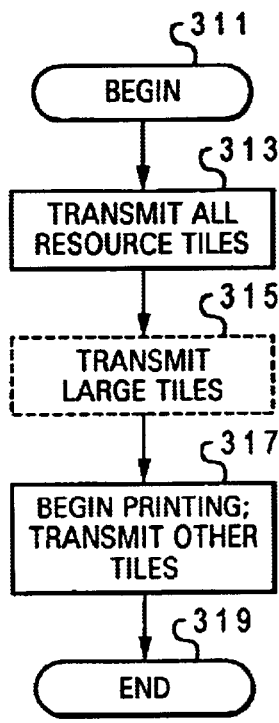

FIG. 3B illustrates the steps by which the second transmission process is implemented. The general principle behind the second process is to download only the tiles that are used more than once (i.e., resources) before the job begins to print. Thus, once the process begins at block 311, the resource tiles are downloaded to the printer at block 313. Using this process decreases the download time, but may increase the possibility that a non-recurring tile is too large to be sent to the presentation device in time.

In another embodiment, a variant of the second transmission process takes into account both the size and reuse of tiles, so that enough data is downloaded before the job starts printing and so that the download data rate is enough to sustain the rated speed of the presentation device. "Large" unique tiles are also downloaded before the job starts to print. Differing definitions of "large" may be utilized including: a) tile over some arbitrary size; b) largest tile in the image; and c) tiles that make the tile overflow the download window. Thus in FIG. 3B, large tiles are downloaded at block 315. The print process then begins at block 317, and the process ends at block 319. Of course, tiles other than resource tiles and "large" tiles are downloaded "on-the-fly" after the print process begins.

Figure 3C:
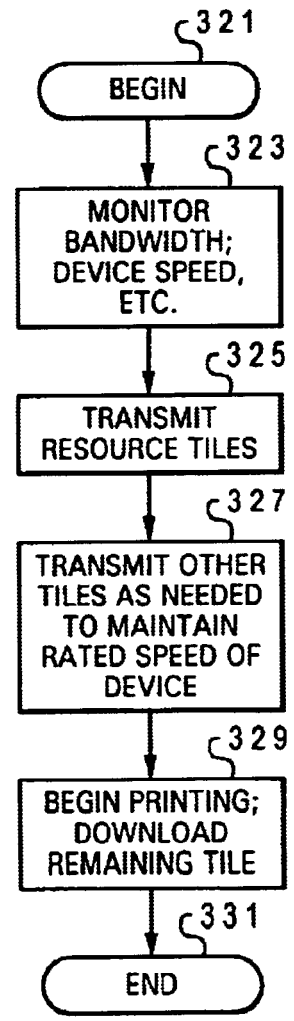

The third transmission process, illustrated in FIG. 3C, takes into account both the bandwidth and the rated speed of the presentation device at block 323. In some data streams, such as Mixed Object Document Content Architecture, the resources can be downloaded either before the first page or during the print job. Once all the tiles are generated for the job and their sizes and reuse frequencies are known, the tiles are assigned to download slots. The resource tiles are transmitted first at block 325. Some of the other tiles, such as the tiles for the first page, might be downloaded before the job starts printing at block 327, while the remaining tiles are downloaded later, as the job is being printed at block 329. The process then ends at block 331.

The third transmission process further takes into consideration the size of each tile, the available transmission bandwidth, and the device speed, which can be ascertained by the computer system. The process then implements a transmission scheme by which minimum data is transmitted before the print job begins, thereby minimizing the download time (i.e., initial wait) before the job starts printing, while still guaranteeing that the data required to be sent during printing will not exceed the available bandwidth to the device and ensuring the device receives sufficient data to operate at its rated speed.

In the preferred implementation, it is assumed that the image has been processed, i.e., all the rasterized tile data generated and resources identified before the first tile is sent to the presentation device. However, as will be apparent to persons skilled in the art, these processes can be modified so that downloading begins while the rasterized tile data is still being generated for later tiles. This may be possible in processors running in the GHz range of processing speed or in systems using multiple processors in parallel. Depending on the specific implementations, processes within the image data transmission utility may not have more than individual page information available (i.e., the entire image dimensions, etc., are not available) at download time. Evaluation of the conditions may then be made based on a page by page determination or, depending on the lag time before the pages need to be transmitted to the presentation device, the evaluation may occur on a subset of pages within the image. The image data transmission utility may thus not be able to guarantee that the presentation device is supplied at rated speed, but may be able to prevent page data from exceeding the available bandwidth, with some certainty.

Following are two examples illustrating the use of each of the three processes to manage tile resources and the presentation data stream to the presentation device, (e.g., printer). In the following examples, time units are utilized in lieu of actual time. For the purposes of discussion, it is assumed that it takes 3 time units to print a single page and that all of the data for a page must be present in the printer before the page starts to print. It is noted that in reality a printer may take 0.43 seconds per page. Utilizing an integer value of 3 time units thus simplifies the discussion. The requirement that all the data for a page be present before the page starts to print is also not necessary for the invention, but is also utilized to simplify the discussion of the examples.

The tiles in the examples are labeled c<x>−<y>(s) and l<x>−<y>(s), where "c" represents a contone layer tile, "l" represents "linework" layer tile, "x" is the page number, "y" is the tile number, and "s" is the number of time units it takes to download the tile to the printer. In order to further simplify the examples, it is assumed in this illustration that only contone tiles may be resource candidates. Duplicated names indicate reused tiles.

EXAMPLE 1

Few Contones Plus Simple Line Work

This example models a simple statement print job, where a few contone images are reused multiple times. The print job is as follows:
Page 1: c1-1(3), c1-2(0.5), l1-1(0.1) l1-2(0.1)
Page 2: c1-1(3), c2-1(0.5), l2-1(0.1) l2-2(0.1)
Page 3: c1-1(3), c1-2(0.5), l3-1(0.1) l1-2(0.1)
Page 4: c1-1(3), c2-1(0.5), l4-1(0.1) l2-2(0.1)
Page 5: c1-1(3), c1-2(0.5), l5-1(0.1) l1-2(0.1)
Page 6: c1-1(3), c2-1(0.5), l6-1(0.1) l2-2(0.1)
Page 7: c1-1(3), c1-2(0.5), l7-1(0.1) l1-2(0.1)

Each page contains 4 tiles. One contone tile is fixed, while the second is one of two possible types. One of the linework tiles is also cycling between two tiles, but the other is unique. The actual print job takes 21 time units (7 pages at 3 time units) to print, not taking into account download times. The processes work as follows.

For processes 1 and 2, c1-1, c1-2, c2-1, l1-1, l1-2 are downloaded before the job starts requiring 4.2 time units of transmission time. After the job starts printing, the download sequence is l2-1, l2-2, l3-1, l1-2, l4-1, l2-2, l5-1, l1-2, l6-1, l2-2, l7-1, l1-2, which takes a total of 1.4 time units. The total print time, from the start of downloading the image data to the time the job finishes printing is 25.2 time units. The initial wait is 4.2 time units, and the download link is idle for 19.6 time units after the print job is transmitted.

With the third process (process 3), c1-1, c1-2, l1-1, l1-2 are downloaded before the job starts, requiring 3.7 time units. After the job starts printing, the download sequence is c2-1, l2-1, l2-2, l3-1, l1-2, l4-1, l2-2, l5-1, l1-2, l6-1, l2-2, l7-1, l1-2, which takes a total of 1.9 time units. The total print time, from the start of downloading the image data to the time the job finishes printing is 24.7 time units. The initial wait is 3.7 time units, and the download link is idle for 19.1 time units after the print job is transmitted. For this illustration, tile c2-1 could be downloaded after the job starts, since the data to print page 2 (c2-1, l2-1, l2-2) takes only 0.7 time units to download, while it takes 3 time units to print page 1.

In this example, the complexity involved in implementing process 3 yields very little benefit in terms of time savings, etc. The invention would therefore select either of the first two processes to govern transmission of the image data to the presentation device. It should, however, be noted that some of the line work tiles could have also been treated as resources, which may have a dramatic effect on the results of the analysis.

EXAMPLE 2

More Complex Contone Job

In a second example, each page contains a mixture of unique and reused contone tiles, and there are no linework tiles.
Page 1: c1-1(1), c1-2(3), c1-3(2), c1-4(1)
Page 2: c2-1(1), c1-2(3), c1-3(2), c2-2(1)

Page 3: c3-1(1), c1-2(3), c1-3(2), c3-2(1)
Page 4: c4-1(1), c4-2(3), c1-3(2), c4-3(1)
Page 5: c5-1(1), c4-2(3), c1-3(2), c5-2(1)
Page 6: c6-1(1), c4-2(3), c1-3(2), c6-2(1)
Page 7: c7-1(1), c4-2(3), c1-3(2), c7-2(3)

The print job again takes 21 time units to print, without counting the initial download time.

Using process 1, all tiles are downloaded before the job starts to print, requiring 24 time units. The total print time is thus 45 time units. The download link is idle while the job is printing.

With process 2, tiles c1-2, c1-3 and c4-2 are treated as resources. Tiles c1-1 and c1-4 must be transferred prior to the start of the job in order to complete download of page 1 in time for printing. Unique tiles on all pages are small enough to timely download on-the-fly, except page 7. (On page 7, the total download time for all the tiles is greater than 3 time units, which is the print time for the page). Thus, using the first two definitions, (a) and (b), of large provided in the above description of algorithm 2, tile c7-2 will be added to the resources and transferred before the print job starts. Using the third definition, (c), tile c7-1 is transferred instead, as this reduces the page transmission time below 3 time units while having minimal effect on the up-front download time. Use of the process with definitions (a) and (b) of large yields an initial download time of 13 time units and total print time of 34 time units. The download link is idle for the last 10 seconds of document presentation. Use of the process with definition (c) has an initial download time of 11 seconds, a total print time of 32 seconds, and the download link is idle for the last 8 seconds of document presentation.

Figure 4:
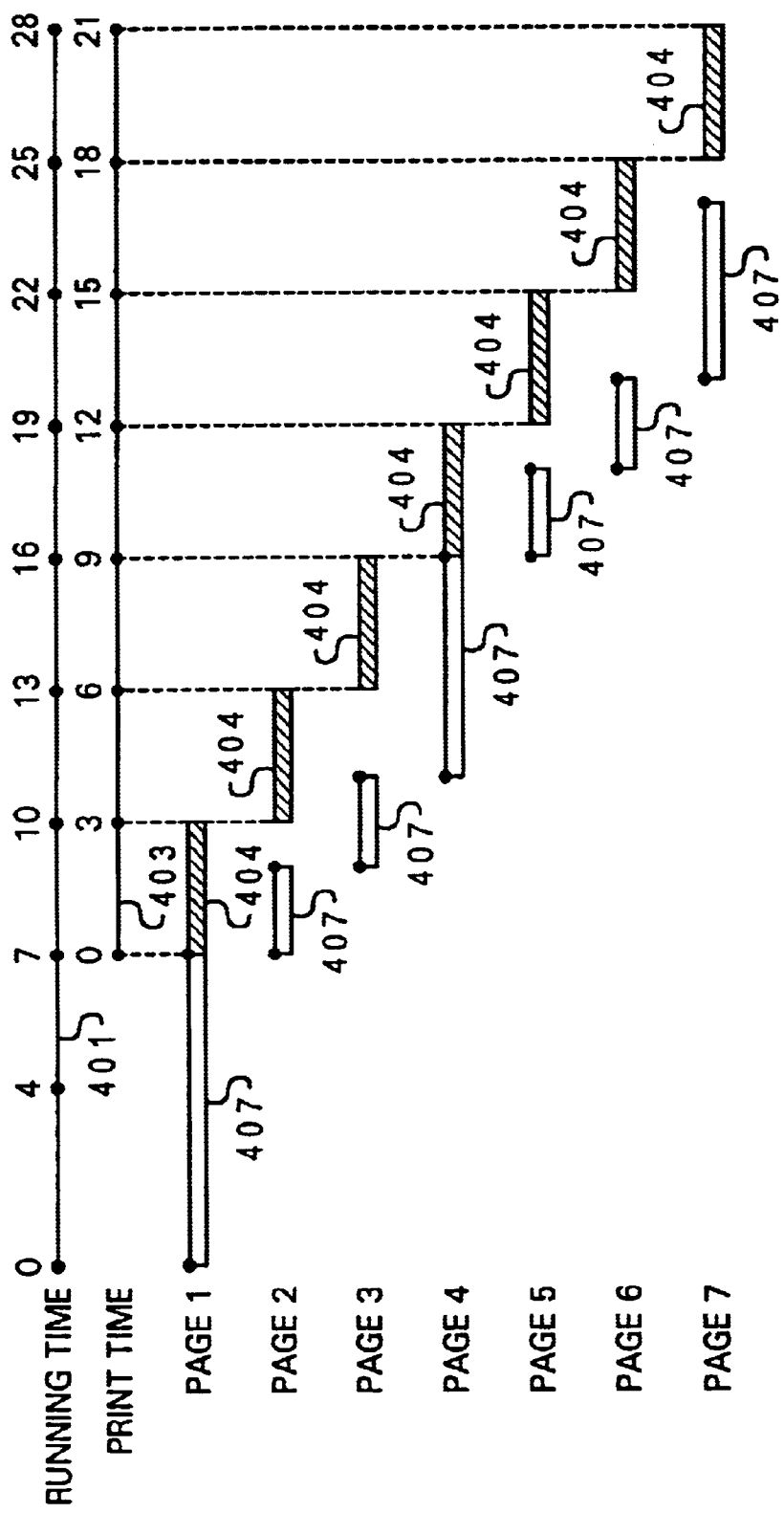
FIG. 4 illustrates a timing sequence for transmission of image data from a computer system and corresponding output to a high speed printer in accordance with preferred embodiments of the present invention.

According to process 3, tiles for page 1 are transferred before the job starts, requiring 7 time units. Afterwards, the tiles for the remaining pages are downloaded on-the-fly in the order they are required for printing. The bandwidth is sufficient to provide the data to the printer on time. FIG. 4 illustrates the timing analysis when utilizing algorithm 3 for this example. In FIG. 4, the running (actual) time and printing time in time units are indicated relative to a time line 401. Below this time line 401, the printing time 403 for each page is indicated. The number of the page being printed and printing duration (3 time units) for each page are indicated with hashed time bars 404.

Finally, the download times for the tiles of each page are illustrated with open time bars 407.

Thus, as page 1 starts printing, page 2 starts downloading. The remaining tiles of page 2, c2-1 and c2-2, take 2 time units to download, leaving a time unit in reserve. Page 3 starts downloading while page 1 is still printing and also takes 2 time units to download its remaining tiles, c3-1 and c3-2. When page 1 finishes printing after 3 time units, page 2 data is already buffered (i.e., already in the print buffer of the printer), and page 2 starts printing. Page 2 finishes printing after 6 time units of printing time. Page 3 data is buffered, because it finished downloading after 4 time units. Page 4 starts downloading after 4 time units and finishes after 9 time units, because tile c4-1 takes 3 time units. Page 3 finishes printing after 9 time units of printing time, and therefore page 4 tiles are already buffered. Page 4 starts printing after 9 time units, and page 5 starts downloading at the same time. Page 5 finishes downloading after 11 time units and starts printing after 12 time units, so the image data are buffered when needed. Page 6 starts downloading after 11 time units and finishes after 13 time units. Page 5 finishes printing after 15 time units, and page 6 starts printing. Page 7 starts downloading after 13 time units and finishes at 17 time units. Page 6 finishes printing at 18 time units, so page 7 starts at that time, and its data were buffered just prior to being needed.

According to this example, under process 3 the total print time is 28 time units, and the link remains idle 4 time units at the end. Thus, for more complex jobs, the differences in the performances of each algorithm (i.e., total download/wait and print times) may be more significant than for simpler jobs. Other factors may also determine which algorithm is eventually selected to transmit image data to the presentation device.

One advantage of the invention is that it is applicable to any data type and does not require any major changes in design and/or operations of the server and the presentation device. If desired, the invention may be integrated with current image reuse schemes, which rely on access to symbolic data to yield even better performance. Using the transmission methods of the invention allows for the presentation of each individual image in a more optimal manner, while providing better performance of presentation devices and minimizing usage of transmission bandwidth resources.

The embodiments of the present invention are not restricted to a particular object content architecture or image description language, i.e., Image Object Content Architecture (IOCA), as various other mechanisms may be used to represent image objects. Further, although the invention is described with reference to tiled images, those skilled in the art will appreciate that the invention is applicable to other types of image presentation besides use of resource tiles.

In addition, while embodiments of the present invention are described with reference to hard copy printers, e.g., laser printers, ink-jet printers and impact printers, the present invention is equally applicable to other types of presentation devices as well, such as copiers, plotters, facsimile machines, archival devices, such as microfilm/microfiche generators, and display devices. Further, the method and apparatus described herein are applicable to destinations and/or presentation devices that are capable of retransmission, such as a base station for satellite or cellular communications or a paging system, for example. Therefore, as used herein, the act of printing may include any form of output which transforms an electronically encoded and stored form of a document into a visible representation.

As a final matter, it is important to note that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method for efficient transmission of an image to a presentation device comprising the steps of:
   tagging a first occurrence of a recurring tile of said image as a resource;
   identifying each subsequent occurrence of said recurring tile within the image via an identifier of resource and a location within the image of the subsequent occurrence, wherein combined data of said identifier and location require less transmission bandwidth and resources than a corresponding tile;
   determining a transmission order for tiles of said image based on one or more factors; and
   in response to said determination, transmitting said tiles to said presentation device in said transmission order, wherein said transmitting step transmits each subsequent occurrence of said recurring tile as a combination of the resource identifier and the location of the subsequent occurrence within the image, in lieu of actual image data of the subsequent occurrence.

2. The method of claim 1, wherein said one or more factors in said determining step is selected from among a plurality factors, which includes number of resources, size of said image, type of image, transmission bandwidth, output speed of said presentation device, and layer from which said tile is generated or type of tile.

3. The method of claim 1, further comprising the step of generating said tiles from said image.

4. The method of claim 1, wherein said transmitting step comprises transmitting said tiles in an order different from a logical presentation order.

5. The method of claim 1, wherein said determining step includes the steps of:
   calculating a total presentation time of said image utilizing said plurality of factors, wherein said total presentation time includes download time and presentation time; and
   selecting an efficient transmission process in response to said calculating step.

6. The method of claim 1, wherein said selecting step includes the steps of:
   selecting a first transmission process in which all tiles are transmitted before said presentation device begins to present, when said image contains less than a pre-determined number of tiles and less than a pre-determined number of resources;
   selecting a second transmission process in which said resource tiles and said at least one large tile are transmitted before said presentation device begins to present, when said image contains less than a second pre-determined number of resources and at least one non-resource tile is large; and
   selecting a third transmission in which all resources and other tiles required to maintain the rated speed of the presentation device once it begins presenting are transmitted before said presentation device begins to present and all other tiles are transmitted as needed during presentation, when conditions for selecting said first and second transmission processes are not present.

7. The method of claim 6, wherein selecting comprises dynamically selecting a transmission process on a page by page basis as said image is being transmitted.

8. A system for managing image data transmission to a presentation device comprising:
   an image data tile generation utility for creating said tiles from said image;
   an image data storage location for storing a plurality of tiles, which represent said image;
   a tile comparison utility associated with said image data tile generation utility for comparing tiles of said image to determine when two or more tiles are the identical, wherein a first occurrence of said identical tiles is tagged as a resource and all subsequent occurrences are represented via a reference to said first occurrence along with corresponding location coordinates;
   a transmission medium connecting said storage location to said presentation device and having an associated bandwidth;
   an image data transmission utility for determining a transmission order for said tiles and selecting from among a plurality of transmission processes by which said tiles may be most efficiently transmitted to said presentation device; and
   wherein image data for a resource tile is transmitted and each subsequent occurrence of said tile is transmitted as a combination of the reference and the location in lieu of actual image data associated with the subsequent occurrence of the tile.

9. The system of claim 8, wherein said image data transmission utility utilizes a plurality of factors in determining said transmission order and said transmission process, said factors including size of the image, tile sizes, available bandwidth, and output speed of said presentation device.

10. The system of claim 9, wherein said image data transmission utility balances a download time and a transmission time so as to effectuate an overall transmission and output time with minimal pre-output download time, while ensuring that image data is supplied fast enough to maintain a rated speed of said presentation device.

11. A computer program product efficiently processing image data to a presentation device comprising:
   a computer readable medium; and
   program instructions stored on said computer readable medium for:
      determining a transmission order for tiles of said image based on one or more factors;
      calculating a total presentation time of said image utilizing said plurality of factors, wherein said total presentation time includes download time and presentation time;
      selecting an efficient transmission process in response to said calculating step; and
      in response to said determination, transmitting said tiles to said presentation device in said transmission order, via said efficient transmission process.

12. The computer program product of claim 11, wherein said one or more factors in said determining step is selected from a plurality factors, which includes number of resources, size of said image, type of image, transmission bandwidth, output speed of said presentation device, and layer from which said tile is generated or type of tile.

13. The computer program product of claim 12, further comprising program instructions for generating tiles from said image data.

14. The computer program product of claim 13, further comprising program instructions for:
   identifying subsequent occurrences of recurring tiles;
   tagging a first occurrence of said recurring tile as a resource; and
   storing all of said subsequent occurrences as references to said first occurrence including a location of said subsequent occurrences in said image; and wherein said program instruction for transmitting transmits each subsequent occurrence of said tile as a combination of the reference and the location in lieu of actual image data of the subsequent occurrence.

15. The computer program product of claim 11, wherein said program instructions for said transmitting step comprises transmitting said tiles in an order different from a logical presentation order.

16. The computer program product of claim 11, wherein said program instructions for said selecting step includes program instructions for:

selecting a first transmission process in which all tiles are transmitted before said presentation device begins to present, when said image contains less than a pre-determined number of files and less than a pre-determined number of resources;

selecting a second transmission process in which said resource tiles and said at least one large tile are transmitted before said presentation device begins to present, when said image contains less than a second pre-determined number of resources and at least one non-resource tile is large; and selecting a third transmission in which all resources and other tiles required to maintain the rated speed of the presentation device once it begins presenting are transmitted before said presentation device begins to present and all other tiles are transmitted as needed during presentation, when conditions for selecting said first and second transmission processes are not present.

17. The computer program product of claim 16, wherein said program instructions for said selecting step comprises dynamically selecting a transmission process on a page by page basis as said image is being transmitted.

* * * * *